United States Patent
Engelhardt et al.

(12)

(10) Patent No.: US 6,300,423 B1
(45) Date of Patent: Oct. 9, 2001

(54) PROCESS FOR MODIFYING HYDROPHILIC POLYMERS

(75) Inventors: Friedrich Engelhardt, Frankfurt am Main; Uwe Stüven, Bad Soden; Manfred Mayer, Niedernhausen, all of (DE)

(73) Assignee: Cassella Aktiengesellschaft (DE)

( * ) Notice: Subject to any disclaimer, the term of this patent is extended or adjusted under 35 U.S.C. 154(b) by 0 days.

(21) Appl. No.: 08/231,985

(22) Filed: Apr. 21, 1994

Related U.S. Application Data

(63) Continuation of application No. 07/940,055, filed on Sep. 3, 1992, now abandoned.

(30) Foreign Application Priority Data

Sep. 18, 1991 (DE) ................................ 41 31 045

(51) Int. Cl.$^7$ ....................................... C08F 8/32
(52) U.S. Cl. .................. 525/381; 525/328.5; 525/329.9; 525/330.1; 525/382; 525/384; 525/385
(58) Field of Search ................... 525/381, 382, 525/384, 385

(56) References Cited

U.S. PATENT DOCUMENTS 4,587,308    5/1986    Makita et al. .

FOREIGN PATENT DOCUMENTS 0 010 752    5/1980    (EP) .
2 559 158    8/1985    (FR) .
1 376 091    12/1974    (GB) .

OTHER PUBLICATIONS

Schugi Flexomix, Eine Misch–und Agglomeriermachine in einzigartiger Bauweise, Schugi B.V.

Ullmann's Encyclopedia of Industrial Chemistry, Fifth, Completely Revised Edition, vol. B2: Unit Operations I, p. 27–14.

*Primary Examiner*—Bernard Lipman
(74) *Attorney, Agent, or Firm*—Connolly Bove Lodge & Hutz LLP

(57) ABSTRACT

The present invention relates to a process for modifying hydrophilic polymers by mixing with a modifier, characterized in that the pulverulent polymer and the modifier are introduced continuously into a vertical, cylindrical mixer, mixed at a power of from 1,000 to 5,000 Wh/m$^3$ of powder by means of rotating blades at a blade rate of from 100 to 300 s$^{-1}$ at a residence time of 1–10 seconds, during which the powder is passed through zones having energy dissipation densities of 300–600 W/l of mixer volume.

12 Claims, No Drawings

PROCESS FOR MODIFYING HYDROPHILIC POLYMERS

This application is a continuation, of application Ser. No. 07/940,055 filed Sep. 3, 1992, now abandoned.

The present invention relates to a process for modifying hydrophilic polymers by mixing with suitable modifiers.

Hydrophilic polymers can be modified with the aid of suitable additives. In particular, the surface properties of hydrophilic polymer particles can be changed, for example rendered hydrophobic or hydrophilic or compacted. It is also possible to modify the permeability, swelling behaviour, wettability, absorption capacity, etc.

DE-B 22 64 027 and DE 35 03 458 have already disclosed processes for mixing in modifying components, but these processes are unsatisfactory in mixing result and thus in the desired properties and require excessive technical complexity and excessive amounts of energy.

In one process (DE-B 22 64 027) an absorbent powder is intimately mixed with water and crosslinking agents in a twin-cylinder mixer, a so-called "ZIG-ZAG" mixer, or in a horizontal plough mixer, at liquid-addition times of 30 minutes. Agglomerates with a high degree of clumping, which are in some cases very moist, are produced and are dried in a subsequent drier and then treated thermally. It is apparent at this early stage that the high degree of clumping means that uniform distribution is not achieved. Furthermore, the thermal after-treatment causes losses in the effectiveness of the post-crosslinking agent within the agglomerates, in which excess concentrations occur; this is reflected in poor mixing of the remaining particles and an inadequate concentration of the post-crosslinking agent. Since strict requirements are made of the particle size distribution of the powder (for example 1%<100 $\mu$m and <0.5%>800 $\mu$m), the treated powder must be comminuted. The oversized particles which arise on screening are returned to the grinding step. The under-sized particles, which cannot be used further, are mixed with water in a further mixer to give granules, and the granules are dried, ground further to the required particle size distribution and screened.

The process of DE 35 03 458, in which the post-crosslinking agent is introduced into a cone-and-screw mixer and mixed in, also exhibits the crucial disadvantages of agglomerate formation and non-uniform distribution of the post-crosslinking agent on the particles.

In the cone-and-screw mixer, a vertical rotating screw which is parallel to the inclined wall rotates upward in the conical mixer housing which tapers downward, so that good mixing is ensured by the peripheral motion of the screw and the rotation of the screw on its own axis. In spite of this mixing, which is usually good, the above-described disadvantages also occur in this mixing process.

Accordingly, the object of the present invention is to provide a process which ensures homogeneous mixing of modifying components with pulverulent hydrophilic polymers in which the mixing is carried out within a very short time, so that the strong absorption behaviour of the polymer cannot have a disadvantageous effect as far as homogeneous mixing and uniform coating of the surface of the powder particles is concerned, i.e. the mixing should already have occurred before agglomerates can form due to the strong absorption capacity of the powder.

This object is achieved by a process for modifying hydrophilic polymers by mixing with a modifier, characterised in that the pulverulent polymer and the modifier are introduced continuously into a vertical, cylindrical mixer, mixed at a power of from 1,000 to 5,000 Wh/m$^3$ of powder by means of rotating blades at a blade rate of from 100 to 300 s$^{-1}$ at a residence time of 1–10 seconds, during which the powder is passed through zones having energy dissipation densities of 300–600 W/l of mixer volume.

The mixing is preferably carried out at a power of 1,500–3,000 Wh/m$^3$ of powder. The blade rate is preferably 250–300 s$^{-1}$. The cutter heads are preferably seated on a rotating shaft which is mounted coaxially to the mixing tube, and extend with their blade ends to the tube wall, from which they are separated only by a small gap. From 1 to 3, particularly preferably 2, cutter heads, which are arranged one after the other on the shaft, are usually sufficient. Each cutter head can have a plurality of blades, preferably 6, which can be set differently on the head with respect to the flow direction. The preferred residence time is from 1 to 4 seconds. The process according to the invention thus operates at a preferred particle speed of 0.05–1 m/s during passage through the mixture.

The hydrophilic polymer to be modified by the process according to the invention is preferably fed to the mixer via a weight-metering device. It is preferred for the modifying component to likewise be metered by weight and added to the polymer just before entry into the mixer.

It is particularly advantageous if the modified component is liquid. It can be employed as the material itself, or as a solution, emulsion or dispersion. Thus, it may be expedient to carry out the process according to the invention at a temperature above the melting point of the modifying component.

In order to prevent baked deposits on the wall, the cylindrical wall of the mixer can comprise flexible material and be deformed by means of an externally applied roller cage, which is moved vertically up and down. An example of a suitable flexible material is rubber.

The liquid modifying component can be fed in via a tube, preferably via a nozzle (for example a pressure nozzle or two-substance nozzle) or an injector (for example a gas injector).

It is also possible by means of the process according to the invention to homogeneously mix small amounts of modifier with a comparatively large stream of polymer to be modified, so that the surface of the powder is uniformly coated and the powder does not need any further treatment at all with respect to the particle size distribution.

The mixed and uniformly coated powder can, if necessary, be treated in a subsequent continuous drier, in which the removal of the excess moisture and, if appropriate, a post-reaction can be carried out.

Examples of suitable driers are contact driers or fluidised bed driers. Fluidised bed driers are preferably equipped with heating panels or heating tubes in the fluidised bed.

The residence time of the modified polymer is preferably 10–60 minutes, particularly preferably 30 minutes. However, drying and any post-reaction can also be effected by high-energy radiation.

Examples of hydrophilic polymers which are suitable for the process according to the invention are homopolymers and copolymers of water-soluble monomer components, such as acrylic acid, methacrylic acid, crotonic acid, acrylamidopropanesulphonic acid, vinylphosphonic acid, maleic acid, vinylsulphonic acid and salts thereof, preferably alkali metal and ammonium salts. Further suitable monomer components are acrylamides, N-vinyl-amides, the hydroxyalkyl esters of acrylic and methacrylic acid, and basic and cationic monomer components, such as the basic esters and amides of acrylic and methacrylic acid, for example the esters of dimethylaminoethanol, or N-dimethylamino-propyl-methacrylamide, and dimethyldiallylammonium chloride or vinyl-imidazoline. If said polymers carry ionic groups, they may also have been fully or partially neutralised.

It is furthermore possible to employ graft polymers of said hydrophilic monomer components, for example on starch or polyalkylene oxides, in the process according to the invention. Examples of suitable polyalkylene oxides are compounds of the

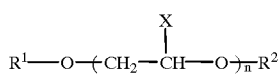
(I)

in which $R^1$ and $R^2$ are H, alkyl, alkenyl or aryl, each of which is optionally substituted, X is H or —$CH_3$ and n is a number from 1 to 10,000.

Examples of suitable compounds are polyethylene glycols, poly-propylene glycols and copolymers and derivatives thereof, and graft matrices, as described in DE-A 39 11 433 and EP 391 108.

Preference is given to hydrophilic polymers which have been made from said monomers and have been crosslinked during the polymerisation by addition of polyolefinically unsaturated compounds. Polymers of this type are capable of absorbing aqeuous solutions, swelling in the process, and are used in the hygiene industry. They are described, for example, in EP-A 316 792, EP-A 343 427, EP-A 391 108, EP-A 400 283, EP-A 417 410 and EP-A 421 264. Particularly preferred polymers are crosslinked polymers based on acrylic acid, methacrylic acid or acrylamidopropanesulphonic acid.

Modified components which are suitable for the process according to the invention are solid substances, such as, for example, phyllosilicates (bentonites and zeolites), pyrogenic silicic acid, diatomaceous earth, activated charcoal, metal oxides, such as, for example, titanium dioxide, calcium oxide, magnesium oxide, aluminium oxide, zirconium oxide, etc., synthetic polymer powders, such as, for example, polyethylene, polypropylene and polyalkylene oxides, or natural polymer powders, such as, for example, polysaccharides, such as starch and starch derivatives, cellulose and cellulose derivatives, and sawdust, or liquid substances, such as, for example, the polyalkylene oxides of the formula I already mentioned above, in particular polyethylene glycols, polypropylene glycols, polyglycols having a molecular weight of up to about 600, paraffins, polyamines, such as, for example, ethylenediamine, diethylenetriamine, polyethylenimine, polyglycidyl compounds, such as, for example, ethylene glycol diglycidyl ether, propylene glycol diglycidyl ether, polyethylene glycol diglycidyl ether and glycerol polyglycidyl ether, solid and liquid polyhydric alcohols, such as, for example, glycerol, pentaerythritol, trimethylolpropane, neopentyl alcohol, sorbitol and polyvinyl alcohol, and solutions or dispersions of the abovementioned substances, and polymer dispersions, such as, for example, polyacrylate dispersions, polyvinyl acetate dispersions, alkylene vinyl acetate copolymer dispersions, butadiene-styrene copolymer dispersions and polyurethane dispersions, or polymer solutions, such as, for example, solutions of poly(meth)acrylates, polyamidoamines, polyvinyl acetate and copolymers.

Particular preference is given to diglycidyl compounds, polyglycidyl compounds and polyamines, for example ethylene glycol diglycidyl ether, polyethylene glycol diglycidyl ether, diethylenetriamine or polyethylenimine.

In the process according to the invention, the modifying components, so long as they do not contain any groups incorporated into the molecule which react chemically with the surface of the polymer particles, are adsorptively bonded to the surface.

Modifying components which contain groups which are capable of reacting chemically with the polymer molecules of the particles may form covalent, ionic or complex bonds, such as, for example, polyglycidyl compounds, polyanions, polycations or polyvalent metal cations.

In the process according to the invention, the weight ratio between the pulverulent polymer and the modifier is, for example, in many cases 1:(0.05 to 0.00005), in particular 1:(0.01 to 0.0001) and preferably 1:(0.005 to 0.0005), in each case calculated solid to solid, or without solvents or dispersants.

EXAMPLE 600 kg/h of a pulverulent, crosslinked, partially neutralised acrylic acid polymer were mixed continuously with 9 kg/h of a 10% strength aqueous solution of ethylene glycol diglycidyl ether in a vertical mixer having a tube diameter of 160 mm and a height of 500 mm. The polymer powder was metered by weight by means of a proportioning belt weigher and was fed to the mixer. The crosslinking agent solution was added, by means of a gravimetric metering balance, via an injector to the powder running into the mixture. Two cutter heads, each with 6 blades, rotating at a blade rate of 300 $s^{-1}$, were mounted on the mixer shaft. The power expended for mixing was 5.6 kW. The residence time of the powder in the mixer was 1.9 s. The powder stream mixed with crosslinking agent and leaving the mixer was perfectly free-flowing and contained no lumps at all.

The particle size distribution of the material leaving the mixture corresponded to the powder employed. The mixed product was fed to a contact drier heated with saturated steam at 145 degrees. The product entering the drier at 31° C. was heated to a temperature of 82° C. under atmospheric pressure, during which 7.6 kg/h of the 8.1 kg/h of moisture introduced with the cross-linking agent was removed. The residence time in the drier was 30 minutes.

What is claimed is:

1. Process for modifying hydrophilic polymers selected from a group consisting of homopolymers and copolymers of acrylic acid, methacrylic acid and acrylamidopropanesulphic acid and graft polymers of said hydrophilic monomer components on starch or polyalkylene oxides of the general formula I

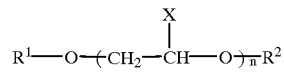

in which $R^1$ and $R^2$ are H, alkyl or aryl, each of which is optionally substituted, X is H or —$CH_3$ and n is a number from 1 to 10,000, by mixing with a modifier selected from a group consisting of ethylenediamine, diethylenetri-amine, ethylene glycol diglycidyl ether, propyylene glycol diglycidyl ether, polyethylene glycol diglycidylether, glycerol polyglycidyl ether and polyamidoamines comprising introducing continuously said modifier into a vertical cylindrical mixer being equipped with a rotating shaft which is mounted coaxially to the mixing tube and which has seated thereon 1 to 3 cutter heads, each cutter head having plurality of rotating blades, and mixing at a power of from 1,500 to 5,000 Wh/m$^3$ of powder by means of said rotating blades at a blade rate of from 100 to 300 s$^{-1}$ at a residence time of 1 to 10 seconds, during which the powder is passed through zones having energy dissipation densities of 300 to 600 W/l of mixer volume.

2. Process according to claim 1, wherein the process is carried out at a temperature above the melting point of the modifying component.

3. Process according to claim 1, wherein a liquid modifying component is fed in via a nozzle or an injector.

4. Process according to claim 1, wherein the cylindrical wall of the mixer comprises flexible material, such as, for example, rubber, and is deformed by means of an externally applied roller cage, which is moved vertically up and down.

5. Process according to claim 4, wherein the flexible material is rubber.

6. Process according to claim 1, wherein after the mixing process, the resultant products is treated in a drier.

7. Process according to claim 6, wherein the residence time in the drier is 10–60 minutes.

8. Process according to claim 7, wherein the residence time in the drier is approximately 30 minutes.

9. Process according to claim 1, wherein the modifier is employed in a pulverulent polymer:modifier weight ratio of 1:(0.05 to 0.00005).

10. Process according to claim 1, wherein the modifier is employed in a pulverulent polymer:modifier weight ratio of 1:(0.01 to 0.0001).

11. Process according to claim 1, wherein the modifier is employed in a pulverulent polymer:modifier weight ratio of 1:(0.005 to 0.0005).

12. Process according to claim 1, wherein the mixing is carried out at a power of from 1,500 to 3,000 Wh/m$^3$ of powder by means of rotating blades at a blade rate of from 250 to 300 s$^{-1}$ at a residence time of 1–4 seconds.

* * * * *

UNITED STATES PATENT AND TRADEMARK OFFICE
CERTIFICATE OF CORRECTION

PATENT NO.    : 6,300,423 B1
DATED         : October 9, 2001
INVENTOR(S)   : Engelhardt et al.

It is certified that error appears in the above-identified patent and that said Letters Patent is hereby corrected as shown below:

<u>Column 4, claim 1,</u>
Line 62, "...propyylene glycol diglycidyl" should read as -- ...propylene glycol diglycidyl --

Signed and Sealed this

Twenty-sixth Day of March, 2002

Attest:

Attesting Officer

JAMES E. ROGAN
*Director of the United States Patent and Trademark Office*